United States Patent Office 3,309,547
Patented Mar. 14, 1967

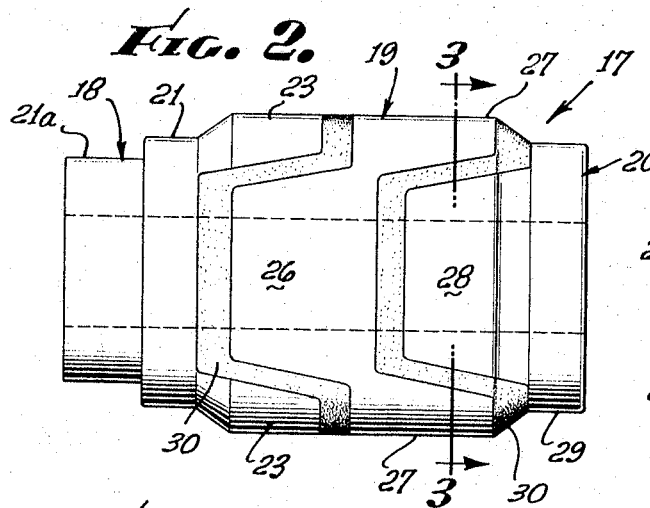
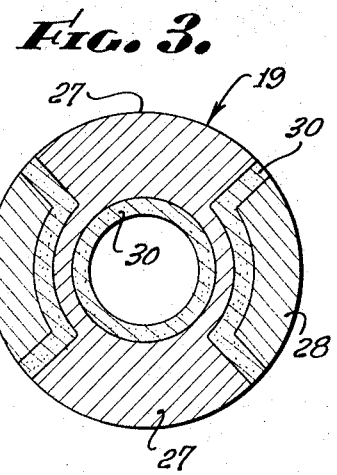
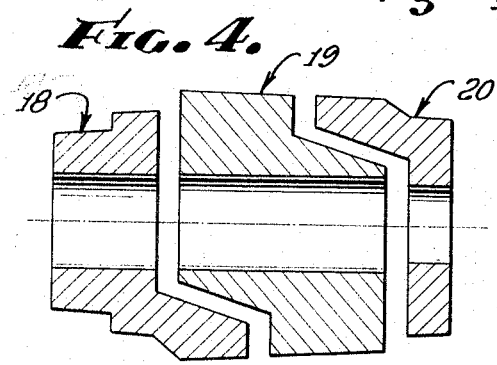
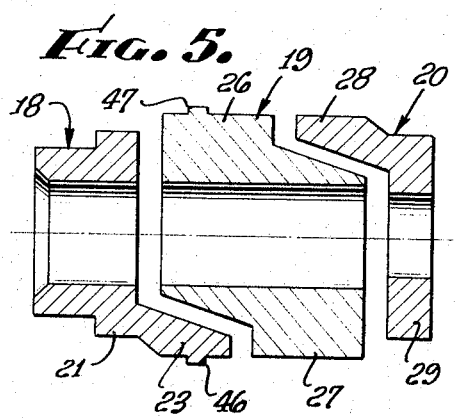
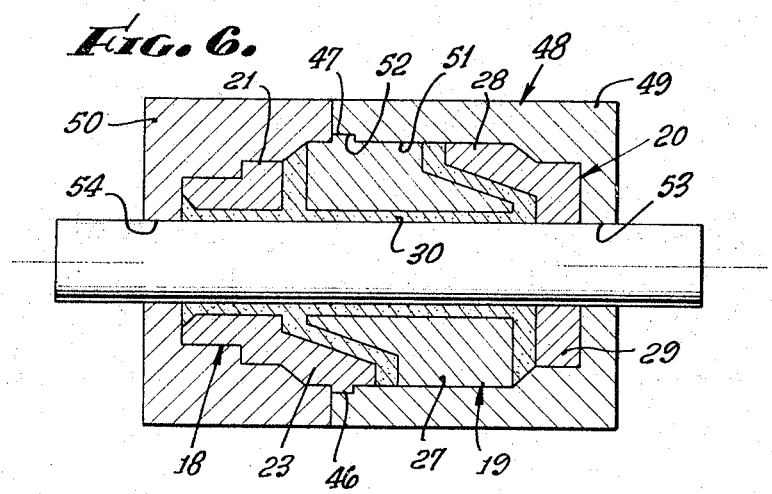

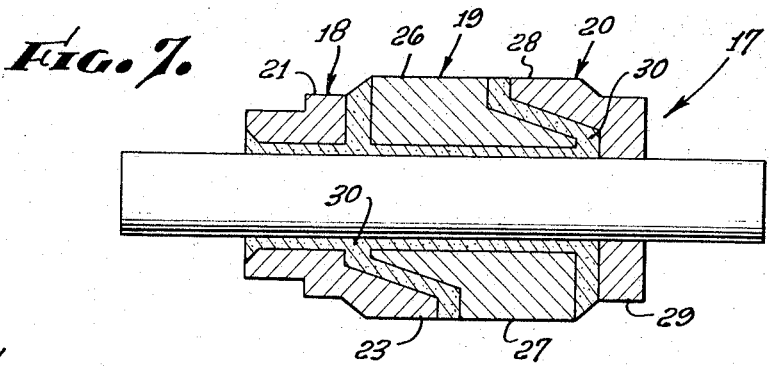
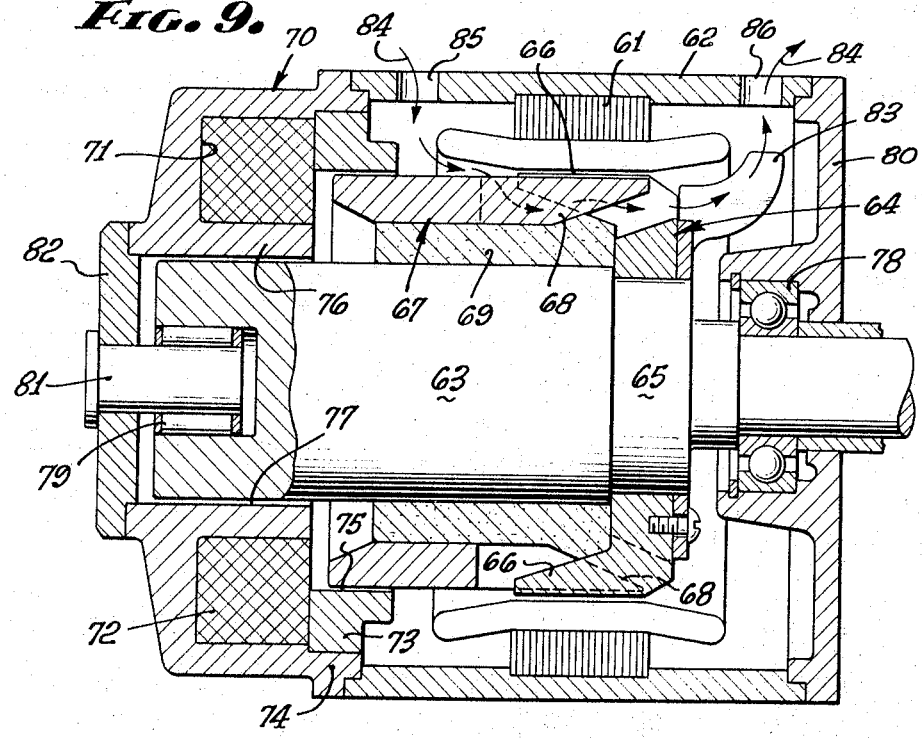
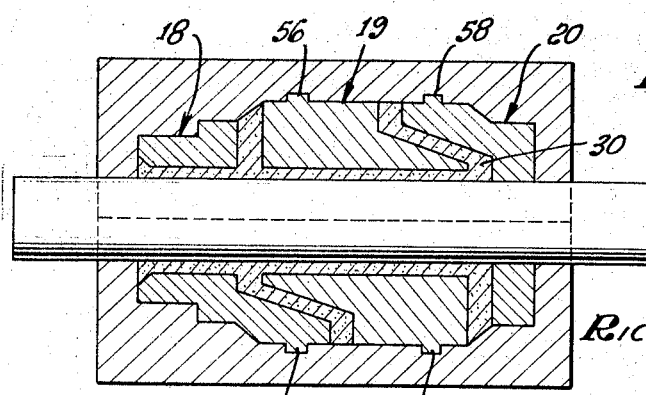

3,309,547
BRUSHLESS ALTERNATOR
Richard C. Woodward, Jr., Fullerton, Calif., assignor to Emerson Electric Co., a corporation of Missouri
Filed Nov. 13, 1962, Ser. No. 237,064
10 Claims. (Cl. 310—168)

This invention relates to a brushless alternator, and particularly to a new magnetic circuit arrangement having unique advantages.

In one known form of brushless alternator, the rotor comprises a pair of axially spaced sections, each having interspaced polar projections separated by a non-magnetic insert. All of the polar projections traverse a common stator structure. The stator structure magnetically links the polar projections through operative or working air gaps at the stator bore. For polarizing the rotor projections, a single field coil is provided about a non-rotary magnetic structure that encompasses the entire stator. This external magnetic structure has two annular ends respectively opposing annular portions of the rotor sections. The magnetic circuit is thus completed through these parasite or non-working air gaps. The field coil itself is located about the stator with a non-magnetic separator on the inside and the magnetic structure for the coil on the outside. This known arrangement is quite bulky compared to conventional alternators of equivalent rating. The stator housing is radically different from that of conventional machines.

The primary object of this invention is to provide a more compact brushless alternator without sacrificing performance or rating, and in which the non-rotary field circuit does not encompass the stator structure, whereby a conventional type stator housing can be used.

A companion object of this invention is to provide a unique magnetic circuit for an alternator in which the flux in the field circuit is reduced for a given rating, whereby less iron is required. Accordingly, space is available for utilizing a shaft of magnetic material conveniently to close the magnetic circuit. The bulky stator encompassing structures of the prior art are avoided, and furthermore there is no necessity for enlarging the diameter of the machine.

In order to accomplish the foregoing objects, the flux is caused to work at a number of successive air gaps by the aid of intermediate rotor sections. The length of each air gap is reduced so that the combined length is the same as in a single gap machine. Thus regulation and ampere turn requirements are maintained substantially constant.

Another object of this invention is to provide a new brushless alternator structure that provides a substantial saving in metal required for a rotor casting, with consequent economies.

Still another object of this invention is to provide a new magnetic structure for a brushless alternator in which a single field coil is conveniently located in axially spaced relationship to the operative portions of the rotor and the stator at one end of the machine. Accordingly, configurations favorable to good design can be carried out with respect to the rotor and stator without penalty due to the proximity of the coil, and configurations favorable to good design can be carried out with respect to the coil without penalty due to the proximity of the rotor. Furthermore, by disposing the coil at the end of the machine, a small diameter coil can be used with a large cross-sectional area to minimize power consumption. Accordingly, the coil, although lightweight, incurs very small losses.

Still another object of this invention is to provide a new brushless alternator that incorporates a rotor that can easily be manufactured.

Still another object of this invention is to provide improved means and methods for manufacturing a composite rotor structure for a brushless alternator.

This invention possesses many other advantages, and has other objects which may be made more clearly apparent from a consideration of several embodiments of the invention. For this purpose, there are shown a few forms in the drawings accompanying and forming part of the present specification, and which drawings, unless described as diagrammatic, or unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIG. 2 is an elevational view of the rotor structure;

FIG. 3 is a transverse sectional view taken along a plane corresponding to line 3—3 of FIG. 2;

FIG. 4 is a rotated axial sectional view illustrating unfinished and unassembled steel parts of which the rotor is made;

FIG. 5 is a view similar to FIG. 4 but illustrating the parts after a rough machining operation;

FIG. 6 is a rotated axial sectional view of the parts of FIG. 5 in a mold structure;

FIG. 7 shows the rotor completed by finish machining operations;

FIG. 8 is a rotated axial sectional view similar to FIG. 6, diagrammatically illustrating an alternate method by the aid of which the rotor structure may be made; and FIG. 9 is a rotated axial sectional view similar to FIG. 1, illustrating a modified form of the present invention.

Figure 1:
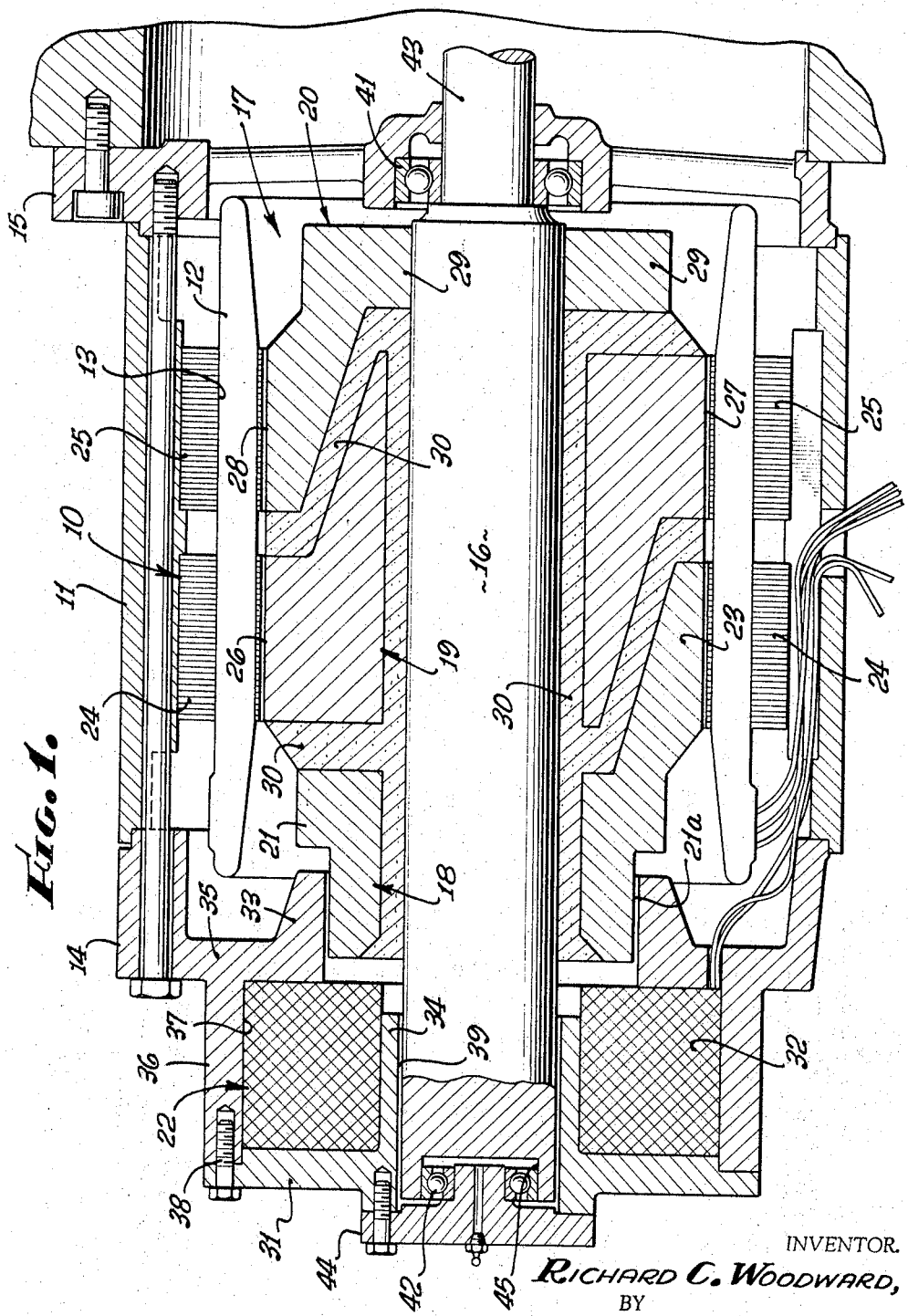
FIGURE 1 is an axial sectional view of a brushless alternator incorporating the present invention.

The alternator shown in FIG. 1 has a stator structure including stator laminations 10 suitably supported in a frame or shell 11. Windings 12 are accommodated in aligned slots 13 of the stator laminations 10. End brackets 14 and 15 are provided for opposite ends of the shell 11. The end brackets 14 and 15 support a shaft 16 of a rotor 17.

The rotor 17, as shown in FIG. 2, comprises three axially spaced sections 18, 19 and 20 of magnetic material, all affixed to the shaft 16 in a manner to be hereinafter described. One end section 18 has an annular hub 21 that extends in spaced encompassing relationship to the shaft 16 which extends through it.

The hub 21 has an extension 21a, the exterior cylindrical surface of which (FIG. 1) cooperates with one pole of a field magnet 22 for magnetizing the rotor poles in a manner to be presently described. The exterior surface of the shaft 16 just beyond the hub extension 21a cooperates with the other pole of the field magnet to complete the magnetic circuit for the rotor.

The end section 18 in this instance has two like diametrically disposed poles 23 that project in one direction from the hub 21 in spaced relationship on opposite sides of the rotor axis. The poles 23 are formed generally as segments of cylinders, with their outer surfaces forming part of the cylindrical boundary of the rotor. The poles 23 have tapering sides so that the angular span of the poles 23 at the hub 21 exceeds that at their other ends, all to provide appropriate output wave form.

The outer surfaces of the poles 23 form the actual polar areas opposed to the stator structure. The poles 23 project beneath one of a number (in this instance, two) of axially spaced groups 24, 25 of the stator laminations. The groups of laminations are spaced from each other so as to provide magnetic isolation, whereby the desired magnetic circuit results.

The flux from poles 23 jumps the air gaps at the boundary of the rotor 17, enters the group of stator laminations 24, divides, moves angularly about the stator group 24, and reenters the rotor 17 at two diametrically disposed poles 26 of the second or intermediate rotor section 19.

The rotor section 19, like the rotor section 18 as shown in FIG. 1, extends in spaced encompassing relationship to the shaft 16 so as to be magnetically isolated therefrom. The section 19 is in the form of a cylindrical ring relieved to provide four poles, the two poles 26 at one end and two poles 27 at the other. These pairs of poles 26 and 27 are both axially and angularly offset from each other, but are joined at the ends of their bases. The angular offset of the poles corresponds substantially to 90° and the axial offset corresponds to the spacing of the stator lamination groups 24 and 25 for purposes presently to appear.

The poles 26 and 27 have exterior surfaces forming a part of the cylindrical external surface of the rotor 17. The poles 26, like the poles 23, are tapered but in a direction opposite that of the poles 26. The poles 26 and 23 mutually project into the trough areas between them. But the poles 23 and 26 are spaced from each other for purposes of magnetic isolation.

The flux entering the poles 26 at diametrically opposite portions of the rotor divides and passes to the poles 27 through the connecting portions at the bases of the poles. The flux transferred to the poles 27 now jumps the air gaps at the second group 25 of stator laminations and acts cumulatively with the flux at the poles 23 to induce electromotive force in the windings 12. While the poles 23 and 27 are shown aligned, they need not be precisely so in accordance with appropriate design techniques.

The flux entering the group 25 of stator laminations divides and moves angularly about the stator laminations approximately 90° and then reenters the rotor at a pair of poles 28 of the third rotor section 20.

The third rotor section 20 is generally similar to the rotor section 18 except that its hub 29 has no extension corresponding to the extension 21a. Furthermore, the shaft 16 fits the central bore of the hub 29 and thus is in magnetic flux transfer relationship to the section 20. The poles 27 and 28 are interpositioned in the same manner that the poles 23 and 26 are, and the poles 27 and 28 are similarly tapered. The flux entering the poles 28 from the group 25 of stator laminations supplements the flux entering the poles 26 to induce electromotive force in the stator windings 12. The flux returns through the shaft 16.

The rotor flux operates at a total of eight air gaps corresponding to the four pairs of poles 23—23, 26—26, 27—27 and 28—28. Each line of flux traverses four air gaps in series in a four-pole machine rather than the conventional two. The flux thus works serially, or in this instance twice. Hence, the total amount of flux is correspondingly reduced. This results in a saving of iron and a more radially compact arrangement. The rotor sections 18 and 19 can be spaced from the shaft 16 which forms an operative part of the magnetic circuit, all without increasing the required diameter of the machine.

The rotor sections 18, 19 and 20 are secured together in proper position by the aid of an aluminum or other non-magnetic filler 30 that is cast into the spaces between the rotor parts 18, 19 and 20 and in a manner herinafter to be described.

The end bracket 14, together with a cover 31 for the end bracket, defines a magnet shell for a non-rotary field coil 32. This magnet shell has annular poles 33 and 34 respectively opposed to the hub extension 21a and the end of the shaft, whereby a magnetomotive force is impressed upon the rotor-stator circuit.

The bracket 14 has a circular wall 35 extending in a plane transverse to the axis of the machine. The pole 33 is formed as a generally cylindrical flange extending inwardly from the wall 35 to define its central opening or bore in which the hub extension 21a is positioned. The bracket 14 also has a cylindrical flange 36 that extends outwardly from the wall 35 to define a recess 37 in which the coil 32 is seated.

The cover 31 is circularly formed, and encloses the coil 32 by overlying the end of the flange 36. Screws 38 attach the cover to the flange 36. The pole 34 is formed as a cylindrical flange at the central aperture of the cover 31. The pole 34 projects into the coil 32, but terminates well short of the opposite pole 33. The pole 34 has an interior cylindrical surface 39 opposed to the exterior cylindrical surface of the shaft 16. The rotor and stator structure completes the magnetic circuit between the field magnet poles 33 and 34.

In order to support the shaft 16, bearings 41 and 42 are provided. The bearing 41 is supported by the end bracket 15 and cooperates with a reduced extension 43 of the shaft 16. The shaft 16 may be coupled to a suitable source of rotary power, as for example an aircraft engine. The bearing 42 is mounted upon a cap 44 that covers the central aperture cover 31. In the present instance, the bearing 42 fits within a recess 45 at the end of the shaft.

The gaps, as at the poles 33 and 34, are shown of exaggerated dimension, and the working air gaps at the stator may likewise not be exactly to scale, all for purposes of clarity of disclosure.

The field magnet structure 14–31 and the coil 32 are all located at one end of the machine beyond the working portion of the rotor and the lamination stacks 24 and 25. This location is also a factor that makes possible a radially compact machine. Also important is the fact that the coil diameter can readily be increased without in any way affecting the structure of the rotor and stator, such as for purposes of decreasing power requirements for the exciter. The diameter of the coil 32 is not critical to the basic design of the machine.

One method of making the rotor is illustrated in FIGS. 4 through 7.

In FIG. 4 the rotor sections 18, 19 and 20 are illustrated as separate steel parts made roughly to size, as for example by casting processes. In FIG. 4 the plane of the section above the axis extends at 90° to the plane of the section below the axis. This relationship holds true for the remaining figures. Accordingly, the poles of the respective parts are illustrated.

In FIG. 5 the parts 18, 19 and 20 are machined to approach final dimensions. The poles 23 of the part 18 and the poles 26 of the intermediate part 19 have companion or complementary peripheral ridges 46 and 47 that serve to locate the parts 18 and 19 in a mold structure 48 shown in FIG. 6.

The mold structure 48 comprises two axially separable parts 49 and 50 together defining a cavity 51 for the parts 18, 19 and 20. The part 20 is seated at the end of the cavity 51 as provided by the mold part 49. The ridges 46 and 47 are located in a common groove 52 formed between the abutting ends of the mold parts 49 and 50. The mold parts 49 and 50 have retractable projections or the like (not shown) extending between the poles of the respective parts suitably to determine the relative angular orientation of the parts 18, 19 and 20. The mold parts 49 and 50 have apertures 53 and 54 for the shaft 16 or equivalent arbor. When the parts are suitably in place, the aluminum or other suitable non-magnetic separator structure is cast in place.

As illustrated in FIG. 7, the rotor is subject to a final machining operation for removing the ridges 46 and 47.

In FIG. 8 a pair of axially split mold parts is utilized. In this instance, ridges 55, 56, 57 and 58 are formed peripherally of all the poles of all the parts suitably to locate them in the mold.

In the machine shown and described, a single intermediate rotor section 19 is provided, but it will be obvious that as many intermediate rotor sections may be provided as may be appropriate for design considerations.

The number of stator lamination sections will be one more than the number of intermediate rotor sections. Also, the number of poles can be two, four, or more.

In the form of the invention illustrated in FIG. 9, there are no intermediate rotor sections at all and there is but one group 61 of stator laminations in a shell 62. Nevertheless, the field coil location is similar and is advantageous by itself.

The shaft 63 at its reduced extension 65 mounts one of the rotor sections 64. The rotor section 64 has a pair of poles 66 passing beneath the stator laminations 61. The other rotor section 67 has a pair of poles 68 interpositioned with the poles 66 of the rotor section.

As before, the poles 66 and 68 are separated from each other. The rotor section 67 is mounted upon the shaft 63 by the aid of a non-magnetic separator 69 of cast aluminum or the like. The rotor section 67 projects beyond the stack 61 to provide an annular area cooperable with one pole of the field magnet, and the shaft 63 similarly provides at its lefthand end an annular area for cooperation with the other pole of the field magnet.

In the present instance, a magnet shell 70 is fitted to one end of the stator frame 62 as an end bracket. The shell 70 provides an inwardly opening annular recess 71 in which a field coil 72 is accommodated. A ring 73 overlies the outer margin of the coil 72 and is attached to a peripheral flange 74 of the shell. The ring 73 has an inner annular area 75 forming the operative pole of the field magnet opposite the rotor section 67. A cylindrical flange 76 forming the inner boundary of the annular recess 71 provides an interior annular polar surface 77 opposed to and cooperable with the end of the shaft 63. Upon excitation of the coil 72, magnetomotive force is impressed upon the magnetic circuit including, in series, the rotor section 67, poles 68, stator laminations 61, pole 66, rotor section 64 and the shaft 63.

The shaft 63 is supported at opposite ends by bearings 78 and 79. The bearing 78 is a ball type structure mounted in an end bracket 80, and the bearing 79 is a bushing type mounted upon a pin 81 of a cap 82 closing the central aperture of the magnet shell or end bracket 70.

The location of the coil 72 makes possible a compact mutual orientation of the operative alternator parts. Also, the lateral orientation of the field coil 72 permits a simple method for circulating air through the housing. Thus, a fan 83, attached to the end of the rotor section 64, induces air flow, as indicated by the arrows 84 from ports 85 at one end of the shell 62 past the rotor and stator to ports 86 at the other end of the shell.

The inventor claims:

1. In a brushless synchronous dynamoelectric machine: a stator of magnetic material; a rotor shaft of magnetic flux transfer relationship thereto, said second having pole means in magnetic flux transfer relationship to said shaft and rotatable within the stator structure; a second rotor section mounted on the shaft but out of magnetic flux transfer relationship thereto, said second rotor section having pole means rotatable within the stator structure; said rotor sections being magnetically separated parts of a rotor structure; said second rotor section having a cylindrical part located beyond the stator in magnetic flux transfer relationship to its pole means; and a non-rotary field magnet structure having annular pole parts providing cylindrical surfaces respectively opposed to the shaft and the cylindrical part of said second rotor section, said field magnet being located beyond the end of the stator structure.

2. In a brushless synchronous dynamoelectric machine: a pair of axially spaced end rotor sections each having pole mean; magnet means causing the poles of said end rotor sections to be opposite magnetic polarity; a number of intermediate rotor sections each having pole means at opposite ends of opposite magnetic polarity and axially and angularly offset from each other; the pole means of successive rotor sections being interspaced to form sets of poles of opposite magnetic polarities; and a number exceeding by one, the number of intermediate rotor sections, of stator sections magnetically isolated each from the other, there being one stator section for each set of poles; a common stator winding for said stator sections; the rotor sections being magnetically isolated each from the other.

3. In a brushless synchronous dynamoelectric machine: a pair of axially spaced end rotor sections each having pole means; a number of intermediate rotor sections each having pole means at opposite ends axially and angularly offset from each other; the pole means of successive rotor sections being interspaced to form sets of poles; a number exceeding by one, the number of immediate rotor sections, of stator sections magnetically isolated each from the other, there being one stator section for each set of poles; the rotor sections being magnetically isolated each from the other; each end rotor sections having an annular part; a common stator winding for said stator sections; and a non-rotary field magnet having opposite magnetic poles cooperable respectively with said annular parts of applying a magnetomotive force to said rotor sections to cause flux to traverse the stator sections in series.

4. In a brushless synchronous dynamoelectric machine: a pair of axially spaced end rotor sections each having pole means; a number of intermediate rotor sections each having pole means at opposite ends axially and angularly offset from each other; the pole means of successive rotor sections being interspaced to form sets of poles; a number exceeding by one, the number of intermediate rotor sections, of stator sections magnetically isolated each from the other, there being one stator section for each set of poles; the rotor sections being magnetically isolated each from the other; a shaft in magnetic flux transfer relationship to one of said end rotor sections and having a part located beyond the other of said end rotor sections, the shaft being magnetically isolated from all but said one end rotor section; said other end rotor section having an annular part; a common stator winding for said stator sections; and a non-rotary field magnet having opposite magnetic poles cooperable with said shaft and said annular part respectively for applying a magnetomotive force to said rotor sections to cause flux to traverse the stator sections in series.

5. In a brushless synchronous dynamoelectric machine: a pair of axially spaced end rotor sections each having pole means; a number of intermediate rotor sections each having pole means at opposite ends axially and angularly offset from each other; the pole means of successive rotor sections being interspaced to form sets of poles; a number exceeding by one, the number of intermediate rotor sections, of stator sections magnetically isolated each from the other, there being one stator section for each set of poles; the rotor sections being magnetically isolated each from the other; said end rotor sections having annular parts both accessible at one end of the rotor beyond the stator sections; a common stator winding for said stator sections; and a non-rotary field magnet having opposite magnetic annular poles cooperable with said annular parts for applying a magnetomotive force to said rotor sections to cause flux to traverse the stator sections in series.

6. In a brushless synchronous dynamoelectric machine: a number of circularly extending coaxial stator sections spaced from each other along one dimension of the machine; a common stator winding for said stator sections; a pair of coaxial end rotor sections also spaced from each other along said one dimension, each of said rotor sections having a number of equiangularly spaced poles, respectively positioned to traverse along the end stator sections; a number of flux transfer rotor sections having poles on opposite sides interpositioned with but spaced from the poles of other sections and defining flux paths between successive stator sections, the poles on one side being substantially aligned with the poles of each adjacent section on the other side whereby a cumulative dynamoelectric effect is achieved by utilizing the flux at a number of air gaps in series; and means for applying a magnetomotive force across the end rotor sections to cause the poles of said end rotor sections to be of opposite magnetic polarity and said poles of said flux transfer rotor sections at opposite sides to be of opposite magnetic polarity whereby the flux traverses the stator sections in series.

7. In a brushless synchronous dynamoelectric machine: a pair of circularly extending coaxial stator sections spaced from each other along one dimension of the machine; a common stator winding for said stator sections; a pair of coaxial end rotor sections also spaced from each other along said one dimension, each of said rotor sections having a number of equiangularly spaced poles angularly spaced from the poles of the other section, the poles of the rotor sections being positioned to traverse along the respective stator sections; a flux transfer rotor section having equiangularly spaced poles on opposite sides, the poles on one side being angularly offset from the poles on the other side, the poles on one side being in magnetic flux transfer relationship to the poles on the other side, the poles on opposite sides being respectively interpositioned with but spaced from the poles of the respective end rotor sections; means mounting the rotor sections for rotation in unison; and means for applying a magnetomotive force across the end rotor sections to cause the poles of said end rotor sections to be of opposite magnetic polarity and said poles of said flux transfer rotor section at opposite sides to be of opposite magnetic polarity whereby the flux traverses the stator sections in series.

8. In a brushless synchronous dynamoelectric machine: two axially spaced groups of substantially circular stator laminations; a common stator winding for said groups of stator laminations; a rotor structure having a pair of end sections and an intermediate section; the end rotor sections being axially spaced from each other and each having a number of equiangularly spaced poles angularly spaced from the poles of the other rotor section, the rotor sections being positioned to traverse along the respective stator lamination groups; a flux transfer rotor section having equiangularly spaced poles on opposite sides, the poles on one side being angularly offset from the poles on the other side, the poles on one side being in magnetic flux transfer relationship to the poles on the other side, the poles on opposite sides being interpositioned with but spaced from the poles of the respective end rotor sections; means mounting the rotor sections for rotation in unison; and means for applying a magnetomotive force across the end rotor sections to cause the poles of said end rotor sections to be of opposite magnetic polarity and said poles of said flux transfer rotor section at opposite sides to be of opposite magnetic polarity whereby the flux traverses the stator groups in series.

9. In a brushless synchronous dynamoelectric machine: two axially spaced groups of substantially circular stator laminations; a common stator winding for said groups of stator laminations; a rotor structure having a pair of end sections and an intermediate section; the end rotor sections being axially spaced from each other and each having a number of equiangularly spaced poles projecting on one side from a common hub in a direction paralleling the axis of the machine, said poles of each rotor section bring angularly spaced from the poles of the other rotor section, the rotor sections being positioned to traverse along the respective stator lamination groups; a flux transfer rotor section formed substantially as a cylindrical ring with its sides relieved to form equiangularly spaced poles on opposite sides, the poles on one side being angularly offset from the poles on the other side, the poles on one side being in magnetic flux transfer relationship to the poles on the other side, the poles on opposite sides being interpositioned with but spaced from the poles of the respective end rotor sections; means mounting the rotor sections for rotation in unison; and a non-rotary field magnet having annular poles magnetically cooperable with said rotor sections by the aid of said hubs for applying a magnetomotive force across the end rotor sections to cause the poles of said end rotor sections to be of opposite magnetic polarity and said poles of said flux transfer rotor section at opposite sides to be of opposite magnetic polarity whereby the flux traverses the stator groups in series.

10. In a brushless synchronous dynamoelectric machine: two axially spaced groups of substantially circular stator laminations; a common stator winding for said groups of stator laminations; a rotor structure having a pair of end sections and an intermediate section; the end rotor sections being axially spaced from each other and each having a number of equiangularly spaced poles projecting on one side from a common hub in a direction paralleling the axis of the machine, said poles of each rotor section being angularly spaced from the poles of the other rotor section, the rotor sections being positioned to traverse along the respective stator lamination groups; a flux transfer rotor section formed substantially as a cylindrical ring with its sides relieved to form equiangularly spaced poles on opposite sides, the poles on one side being angularly offset from the poles on the other side, the poles on one side being in magnetic flux transfer relationship to the poles on the other side, the poles on opposite sides being interpositioned with but spaced from the poles of the respective end rotor sections; means mounting the rotor sections for rotation in unison; a rotor shaft of magnetic material extending through one of said end rotor sections and said transfer rotor section and attached to the hub of the other end rotor section for magnetic connection thereto, said shaft being magnetically isolated from said other rotor sections; and a non-rotary field magnet adjacent the said one end rotor section and having annular poles respectively opposed to the shaft and the hub of said one end rotor section for applying a magnetomotive force to said rotor to cause the poles of said end rotor sections to be of opposite magnetic polarity and said poles of said flux transfer rotor section at opposite sides to be of opposite magnetic polarity whereby the flux traverses the stator groups in series.

References Cited by the Examiner
UNITED STATES PATENTS

| | | | |
|---|---|---|---|
| 2,384,489 | 9/1945 | Pancher | 29—155.53 |
| 2,479,589 | 8/1949 | Parker. | |
| 2,769,106 | 10/1956 | Dembowski | 310—168 |
| 2,928,963 | 3/1960 | Bertsche et al. | 310—168 |
| 2,996,791 | 8/1961 | Hicks | 29—155.53 |
| 3,223,916 | 12/1965 | Shafranek et al. | 310—168 X |
| 3,239,702 | 3/1966 | Van De Graaff | 310—168 |

ORIS L. RADER, *Primary Examiner.*

MILTON O. HIRSHFIELD, *Examiner.*

G. SIMMONS, *Assistant Examiner.*